United States Patent Office 2,742,344
Patented Apr. 17, 1956

2,742,344

MANUFACTURE OF SODIUM CYANIDE

Byron N. Inman, Tonawanda, and Charles H. Lemke, Niagara Falls, N. Y., assignors to E. I. du Pont de Nemours & Company, Wilmington, Del., a corporation of Delaware No Drawing. Application March 16, 1953,
Serial No. 342,701

4 Claims. (Cl. 23—79)

This invention relates to the production of sodium cyanide and more particularly to the production of sodium cyanide by the neutralization of caustic soda with gaseous hydrogen cyanide.

Sodium cyanide has been prepared heretofore by means of the general procedure outlined above. The product so obtained however has usually been quite impure unless subjected to expensive purification steps. One contaminant frequently formed along with the sodium cyanide is sodium carbonate. This material becomes especially troublesome when the hydrogen cyanide utilized contains a rather high percentage of carbon dioxide as does that manufactured by some of the modern methods. The effluent gases produced by the method of Andrussow, U. S. P. 1,934,838, for example, may contain around 6% of hydrogen cyanide, 2% ammonia and about 0.2% carbon dioxide, the remainder consisting largely of inert materials such as nitrogen and water vapor. Since Andrussow uses relatively cheap starting materials, air, natural gas and ammonia, his process is widely used today. In addition to sodium carbonate, the sodium cyanide produced by the neutralization method may contain cyanide polymerization products, sodium hydroxide and sodium formate, all of which detract from the value of the product.

A primary object of this invention is development of a novel method for preparing substantially pure sodium cyanide in the wet way, that is by the neutralization of caustic with hydrogen cyanide. A second object of the invention is development of a process for making acceptable sodium cyanide by neutralizing caustic with hydrogen cyanide contaminated with carbon dioxide. Another object of the invention is development of a process for reducing the carbonate content of sodium cyanide made in the wet way. A further object of the invention is to develop a process for making sodium cyanide in the wet way without the formation of cyanide polymers. Another object is development of a wet process for making sodium cyanide of an acceptable hydroxide content. A further object of the invention is development of a process for making sodium cyanide of a low formate content.

Probably the most objectionable of the impurities which may be formed in the wet process are the hydrogen cyanide polymers. Generally these materials will be present to a less extent than the carbonates but they are easily detectable in solution and in the final dried sodium cyanide because they are colored. The polymers exhibit a wide variety of colors, depending on the conditions of formation, and may range from red and brown through yellow to black. A major feature of this invention is the discovery that polymerization can be repressed if a minimum of about 0.2% by weight of hydroxide, calculated as sodium hydroxide, is maintained in the cyanide solutions. Any method adopted for removing carbonates must therefore permit this minimum quantity of caustic to be held in solution.

The objectives of the invention can be achieved by a process which comprises first passing hydrogen cyanide gas into caustic solution so as to leave about 0.5% of the caustic unneutralized and then precipitating carbonates by adding calcium cyanide to the solution. The amount of calcium cyanide utilized as an aqueous solution must however be carefully controlled since calcium hydroxide is so insoluble that the caustic content of the sodium cyanide would be reduced too greatly if an excess of calcium cyanide were added. Actually it is found impossible to remove all the carbonate without some loss of caustic. The amount of calcium cyanide required to precipitate the carbonate therefore cannot be calculated accurately from simple determination of the carbonate present. Still less can it be calculated from the stoichiometric value required to precipitate both the carbonate and hydroxide. If all the caustic were removed the cyanide would, as noted, polymerize and discolor the solution. Excess calcium cyanide would also result in undesirable and contaminating calcium ions being left in solution.

It has been found that desirable water white solution can be maintained if the amount of calcium cyanide added thereto is determined by the following equation:

$$G = H \frac{(1.89B + 2.5C - 1)}{(2.18A + 1)}$$

In this expression:

$A$ = wt. percent calcium cyanide in solution (numerical value);
$B$ = wt. percent sodium carbonate in solution (numerical value);
$C$ = wt. percent sodium hydroxide in solution (numerical value);
$G$ = wt. of calcium cyanide solution to be added;
$H$ = wt. of sodium cyanide solution to be treated.

The equation given is valid for the reaction of a solution containing around 25–37.5% sodium cyanide, about 3.0–3.6% sodium carbonate and about 0.3–0.5% sodium hydroxide with another containing 10–14% calcium cyanide and is independent of the sodium cyanide concentration for concentrations in the 25–37.5% sodium cyanide range. It may be valid for solutions with concentration limits slightly above those stated but not for solutions with limits greatly above. The lower limits of sodium carbonate and caustic are not as critical as the upper limits and initial solution containing less than 3% sodium carbonate can be effectively treated after the method of this invention. The value of G obtained from the equation may be varied within the limits ±5% and still give sufficiently accurate results. When the proportions are calculated as described, a maximum of carbonate is removed and enough hydroxide is retained in solution to prevent discoloration. Additionally, the percentage of formate usually present in the solution is reduced. Formate is generally produced in the wet process by the hydrolysis of some of the cyanide. Suppression of formate, while most desirable, is quite unexpected since both sodium and calcium formates are relatively soluble compounds. The final sodium cyanide solution should not contain more than about 0.5% carbonate and 0.5% caustic for a total initial sodium cyanide concentration of 25–37.5%. Evaporation of such a solution, after removal of precipitated matter by filtration, yields an acceptable solid commercial product containing about 96–98% sodium cyanide, about 1% sodium carbonate, less than 1% sodium hydroxide and some water and formate. All percentages given here are weight percentages.

The sodium cyanide solutions used in this invention may be made up by dissolving caustic in water and passing impure gases obtained as by the Andrussow synthesis through the caustic solution. To avoid waste of a valuable compound, residual ammonia in the effluent product gases may be removed before passage through the dissolved hydroxide. The gases flowing through the caustic solution therefore contain 6–8% hydrogen cyanide, 0.2–0.5% carbon dioxide, some hydrogen, nitrogen and carbon monoxide. Enough sodium hydroxide should be used to give an ultimate solution with concentrations falling within the ranges set forth above, i. e. 25–37.5% sodium cyanide, about 3.0–3.6% sodium carbonate and about 0.2–0.5% sodium hydroxide.

The calcium cyanide solution used for the purification step could be made up by dissolving solid calcium cyanide in water. This pure cyanide is however not a commercial product and is very unstable. Preferably therefore gaseous hydrogen cyanide is passed through a slurry of lime in water to give a solution containing 10–14% calcium cyanide. The source of the hydrogen cyanide used for making the calcium compound is immaterial, the impure product of the Andrussow process being quite satisfactory. Some precautions, nevertheless, are essential. The concentration of dissolved calcium cyanide in the slurry must for example not be allowed to become too high. If the concentration of calcium cyanide rises above 14%, red or yellow discolorations are rapidly formed which can adversely affect the quality of the sodium cyanide produced. The same results are obtained if the temperature of the solution is allowed to rise much above 60° C. or if the solution stands for much more than an hour at the preferred absorption temperature of around 45° C.–50° C. These discolorations are probably caused by hydrocyanic acid polymers or decomposition products. In practice enough slaked lime to give a 10–14% solution of calcium cyanide is slurried in water and raw gases containing hydrogen cyanide, ammonia, carbon dioxide and inert materials are passed through the slurry at around 45°–50° C. The resultant solution may be filtered to remove carbonate and any excess lime and, if it is not used immediately, cooled for storage to not more than about 25° C. Filtration of this solution is not essential but is desirable to facilitate the subsequent filtration of the sodium cyanide solution. If the solution is to be stored for any length of time a slight excess of solid lime should be left unfiltered to repress polymerization.

When the calcium cyanide and impure sodium cyanide solutions have been formed as described, the calculated amount of the former is added to the latter. It is desirable to the practice of this invention that this mode of addition be utilized. If calcium cyanide is added to the caustic solution before the hydrogen cyanide carrying carbon dioxide is passed therethrough, all the calcium cyanide would be initially precipitated as the hydroxide and control of the various concentrations as required by the formula rendered very difficult.

Details of the invention will be evident from the following examples:

*Example 1*

A series of runs was made by adding calcium cyanide solution of around 12.5% concentration to sodium cyanide solution. The sodium cyanide solutions were made by passing the effluent gases produced by reacting natural gas, air and ammonia over a platinum metals catalyst through caustic solutions. The data obtained are displayed in Tables I and II. Table I shows the quantity of calcium cyanide actually employed while Table II shows the amounts required calculated stoichiometrically and on the basis of the equation given above.

*Table I. Actual Quantities of Ca(CN)$_2$ Employed*

| Run | Initial Concentration of Solution | | | Ca(CN)$_2$ Employed | Product Solution | | |
|---|---|---|---|---|---|---|---|
| | Percent NaCN | Percent Na$_2$CO$_3$ | Percent NaOH | | Percent NaCN | Percent Na$_2$CO$_3$ | Percent NaOH |
| 1 | 24.8 | 5.42 | 0.39 | 25.2 | 24.8 | 0.22 | 0.32 |
| 2 | 30.71 | 3.91 | 0.52 | 33.2 | 29.6 | 0.14 | 0.20 |
| 3 | 30.71 | 3.91 | 0.52 | 33.2 | 30.3 | 0.05 | 0.14 |
| 4 | 30.00 | 4.12 | 0.31 | 32.6 | 29.1 | 0.12 | 0.24 |
| 5 | 30.00 | 4.12 | 0.31 | 32.6 | 29.1 | 0.18 | 0.23 |
| 6 | 29.96 | 4.09 | 0.60 | 46.3 | 27.1 | 0.17 | 0.23 |
| 7 | 29.96 | 4.09 | 0.60 | 46.3 | 27.0 | 0.15 | 0.25 |
| 8 | 29.96 | 4.09 | 0.60 | 46.3 | 27.8 | 0.16 | 0.29 |
| 9 | 29.96 | 4.09 | 0.60 | 48.6 | 26.7 | 0.12 | 0.32 |
| 10 | 27.1 | 2.64 | 0.37 | 30.7 | 24.9 | 0.30 | 0.28 |
| 11 | 27.1 | 2.52 | 0.41 | 32.2 | 25.0 | 0.20 | 0.33 |
| 12 | 26.8 | 3.60 | 0.30 | 31.9 | 25.5 | 0.17 | 0.52 |

*Table II. Theoretical Quantities of Ca(CN)$_2$ Required*

| Run | A | B | C | G | H | Stoichiometric | | |
|---|---|---|---|---|---|---|---|---|
| | | | | | | Na$_2$CO$_3$ | NaOH | Sum |
| 1 | 17.67 | 5.42 | 0.39 | 24.7–27.3 | 100.5 | 26.8 | 2.6 | 29.4 |
| 2 | 16.3 | 3.91 | 0.52 | 30.0–33.2 | 150 | 31.2 | 5.5 | 36.7 |
| 3 | 16.3 | 3.91 | 0.52 | 30.0–33.2 | 150 | 31.2 | 5.5 | 36.7 |
| 4 | 15.87 | 4.12 | 0.31 | 30.3–33.5 | 150 | 33.8 | 3.4 | 37.2 |
| 5 | 15.87 | 4.12 | 0.31 | 30.3–33.5 | 150 | 33.8 | 3.4 | 37.2 |
| 6 | 12.10 | 4.09 | 0.60 | 43.0–47.5 | 150 | 43.9 | 8.6 | 52.5 |
| 7 | 12.10 | 4.09 | 0.60 | 43.0–47.5 | 150 | 43.9 | 8.6 | 52.5 |
| 8 | 12.10 | 4.09 | 0.60 | 45.1–50.0 | 150 | 43.9 | 8.6 | 52.5 |
| 9 | 11.51 | 4.09 | 0.60 | 45.1–50.0 | 150 | 46.1 | 9.0 | 55.1 |
| 10 | 10.64 | 2.64 | 0.37 | 29.2–32.2 | 150 | 32.2 | 6.0 | 38.2 |
| 11 | 10.23 | 2.52 | 0.41 | 30.6–33.8 | 150 | 32.0 | 6.7 | 38.7 |
| 12 | 13.7 | 3.60 | 0.30 | 30.3–33.5 | 150 | 34.2 | 3.8 | 38.0 |

NOTE.—The tabulated ranges of G represent the calculated values plus and minus five percent, and indicate the acceptable tolerance to achieve the desired results.

It will be seen that in each case the weight of calcium cyanide actually added to the sodium cyanide solution fell within the range of values calculated for G in the equation given above and that the product solution shows a favorable analysis. In all cases the stoichiometric value for complete carbonate removal is higher than either the G range or the weight actually employed, assuming, as is the case, that all or almost all the hydroxide would have to be removed to remove the carbonate.

*Example 2*

In previous work it had been noted that quite unexpectedly the formate concentration was reduced by the calcium cyanide addition. Four additional runs were made to study this phenomenon, no attempt being made to apply strictly the concentration equation. Four sodium cyanide solutions with different concentrations were made up. Twelve percent calcium cyanide solution was added to each of these to reduce the carbonate to below 0.20%. The precipitate was filtered from the solution and washed with water. The starting solutions, filtrates, washings and precipitates were analyzed. The results are shown in Table III.

Table III. Removal of Formate by $Ca(CN)_2$

| Run | Sample | G | Percent NaCN | Percent Na₂CO₃ | Percent NaOH | Percent NH₃ | Percent NaCOOH | NaCOOH/NaCN | G NaCOOH |
|---|---|---|---|---|---|---|---|---|---|
| 13 | Start soln | 500 | 29.82 | 0.17 | 0.08 | 0.14 | 4.71 | 0.158 | 23.55 |
|    | Filtrate   | 493 | 29.85 | 0.02 | 0.02 | 0.10 | 4.46 | 0.149 | 21.98 |
|    | Cake       | 6.4 | 0.88  |      |      |      | 0.22 | 0.250 | 0.014 |
|    | Washings   | 110 | 5.20  |      |      |      | 0.29 | 0.055 | 0.319 |
| 14 | Start soln | 500 | 30.43 | 2.88 | 0.31 | 0.15 | 4.82 | 0.158 | 24.20 |
|    | Filtrate   | 542 | 28.42 | 0.16 | 0.32 | 0.04 | 4.03 | 0.142 | 21.84 |
|    | Cake       | 31  | 0.19  |      |      |      | 0.22 | 1.158 | 0.068 |
|    | Washings   | 109 | 8.44  |      |      |      | 0.39 | 0.046 | 0.425 |
| 15 | Start soln | 499 | 30.51 | 2.95 | 0.42 | 0.15 | 1.05 | 0.034 | 5.25 |
|    | Filtrate   | 535 | 27.93 | 0.13 | 0.28 | 0.10 | 0.05 | 0.002 | 0.268 |
|    | Cake       | 33  | 0.14  |      |      |      | 0.07 | 0.500 | 0.023 |
|    | Washings   | 133 | 10.70 |      |      |      | 0.05 | 0.005 | 0.067 |
| 16 | Start soln | 500 | 39.25 | 1.77 | 2.55 | 0.15 | 1.19 | 0.030 | 5.95 |
|    | Filtrate   | 534 | 34.00 | 0.19 | 0.35 | 0.13 | 0.42 | 0.012 | 2.24 |
|    | Cake       | 69.8| 2.08  |      |      |      | 0.37 | 0.178 | 0.258 |
|    | Washings   | 145 | 22.58 |      |      |      | 0.18 | 0.008 | 0.261 |

The above cited results for formate removal were erratic, totaling 5% for run 13, 8% for run 14, 93% for run 15 and 41% for run 16. At the lower concentrations such as are present in sodium cyanide made by the wet method the 93 and 41% figures are however appreciable. Use of calcium cyanide for purification will therefore remove substantially all of the carbonate and formate contaminants. The explanation of the formate precipitation is unknown but such precipitation is of great value in obtaining pure sodium cyanide solutions and, ultimately, specification quality solid sodium cyanide.

Such factors as temperature and rate of flow of hydrogen cyanide are not overly critical in this invention. The temperature for the addition of both hydrogen and calcium cyanides should however not exceed around 60° C. At temperatures above this figure polymerization and decomposition products tend to form to the detriment of the product. Consequently the temperature should not be elevated above 60° C. and should be reduced from this value as rapidly as conveniently possible. Polymerization and discoloration generally become noticeable if any of the concentrated cyanide solutions discussed stand for more than about one hour at 60° C.

A continuous process embodying this invention and readily adapted for the maximum control thereof comprises first reacting ammonia, air and natural gas over a platinum-rhodium alloy at around 1200° C., rapidly cooling the product gases to 60–100° C., passing the major portion of the product gases through a moving sodium hydroxide solution of not greater than about 25–37.5% concentration, taking care not to reduce the caustic content below about 0.2–0.5%, passing a minor portion of the effluent gases into an aqueous calcium hydroxide suspension, combining the sodium and calcium cyanide solutions after the respective reactions with hydrogen cyanide, filtering calcium carbonate and other precipitated impurities from the sodium cyanide solution, concentrating the solution and finally evaporating it to dryness, in vacuo if desired, to obtain sodium cyanide of an acceptable commercial grade.

Having now described our invention, we claim:

1. The method of producing sodium cyanide solutions in substantially pure condition which comprises passing through an aqueous sodium hydroxide solution at a temperature not exceeding about 60° C. gaseous hydrogen cyanide contaminated with carbon dioxide to produce a solution containing 25–37.5% by weight of sodium cyanide and around 0.2–0.5% by weight of sodium hydroxide, adding to the solution an aqueous solution of calcium cyanide to precipitate carbonate and formate therefrom but insufficient in quantity to introduce contaminating calcium ions and separating the precipitate from the purified sodium cyanide solution.

2. In the process of producing sodium cyanide solutions by passing gaseous hydrogen cyanide through an aqueous sodium hydroxide solution, the method of removing carbonate and formate from aqueous solutions containing around 25–37.5% by weight of sodium cyanide which comprises adding thereto 95 to 105% of a weight G of aqueous calcium cyanide solution determined by the equation:

$$G = H \frac{(1.89B + 2.5C - 1)}{(2.18A + 1)}$$

where $A$ = wt. percent of calcium cyanide in solution
$B$ = wt. percent of sodium carbonate in solution
$C$ = wt. percent of sodium hydroxide in solution, and
$H$ = wt. of sodium cyanide solution to be treated.

3. The method of making substantially pure sodium cyanide which comprises reacting a gaseous mixture containing hydrogen cyanide, ammonia and carbon dioxide with aqueous sodium hydroxide to produce a solution containing about 25–37.5% by weight of sodium cyanide, about 3.0–3.6% by weight of sodium carbonate and about 0.2–0.5% by weight of sodium hydroxide, adding thereto enough of an aqueous solution containing about 10–14% by weight of calcium cyanide to reduce the carbonate concentration to below about 0.2% but not to reduce the sodium hydroxide concentration to less than 0.2%, filtering the solution and recovering solid sodium cyanide therefrom.

4. The method of claim 3 in which the quantity of aqueous calcium cyanide solution to be added to the sodium cyanide solution is 95–105% of the weight G determined by the equation:

$$G = H \frac{(1.89B + 2.5C - 1)}{(2.18A + 1)}$$

where $A$ = wt. percent of calcium cyanide in solution
$B$ = wt. percent of sodium carbonate in solution
$C$ = wt. percent of sodium hydroxide in solution, and
$H$ = wt. of sodium cyanide solution to be treated.

References Cited in the file of this patent

UNITED STATES PATENTS

| | | |
|---|---|---|
| 1,531,123 | Mittasch et al. | Mar. 24, 1925 |
| 1,586,509 | Glover et al. | May 25, 1926 |
| 2,246,014 | Schraubstadler | June 17, 1941 |
| 2,496,999 | Houpt | Feb. 7, 1950 |
| 2,616,782 | Cain | Nov. 4, 1952 |

OTHER REFERENCES

Ser. No. 339,015 (A. P. C.), published April 27, 1943.